(12) United States Patent
Pei

(10) Patent No.: US 8,736,945 B2
(45) Date of Patent: May 27, 2014

(54) LENS MODULE WITH INFRARED ABSORBING FILTER

(75) Inventor: Shao-Kai Pei, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/420,557

(22) Filed: Mar. 14, 2012

(65) Prior Publication Data

US 2013/0141771 A1    Jun. 6, 2013

(30) Foreign Application Priority Data

Dec. 1, 2011    (TW) .................................. 100144183

(51) Int. Cl.
*G02F 1/153*    (2006.01)

(52) U.S. Cl.
CPC ...................................... *G02F 1/153* (2013.01)

USPC .......................................... 359/275; 359/885

(58) Field of Classification Search
USPC .......... 359/265–275, 350, 355, 359, 360, 362
See application file for complete search history.

(56) References Cited

U.S. PATENT DOCUMENTS 6,746,775 B1 * 6/2004 Boire et al. ................... 428/432
2008/0239236 A1 * 10/2008 Blum et al. ................... 351/159

* cited by examiner

*Primary Examiner* — Scott J Sugarman
*Assistant Examiner* — Robert E Tallman
(74) *Attorney, Agent, or Firm* — Novak Druce Connolly Bove + Quigg LLP

(57) ABSTRACT

A lens module includes an optical element and an infrared absorbing filter covering on the optical element. The infrared absorbing filter includes an electrochromic substrate. The electrochromic substrate changes from colorlessness to blue and absorbs the infrared constituent of incoming light when a preset voltage is applied on the electrochromic substrate.

3 Claims, 3 Drawing Sheets

LENS MODULE WITH INFRARED ABSORBING FILTER

BACKGROUND

1. Technical Field

The present disclosure relates to lens modules and, particularly, to a lens module with an infrared absorbing filter.

2. Description of Related Art

Lens modules may include at least one lens and a filter positioned at an image side of the lens. The filter may include a transparent substrate and an infrared filtering film coated on an object side of the transparent substrate. The filter is for reflecting infrared light while allowing the passage of visible light. However, a minority of visible light, round about 5% or more, will also be reflected by the infrared filtering film. The reflected visible light forms a glare in an image after multiple reflections in the lens module.

Therefore, it is desirable to provide a lens module, which can overcome the limitations described.

DETAILED DESCRIPTION

Embodiments of the disclosure will be described with reference to the drawings.

Figure 1:
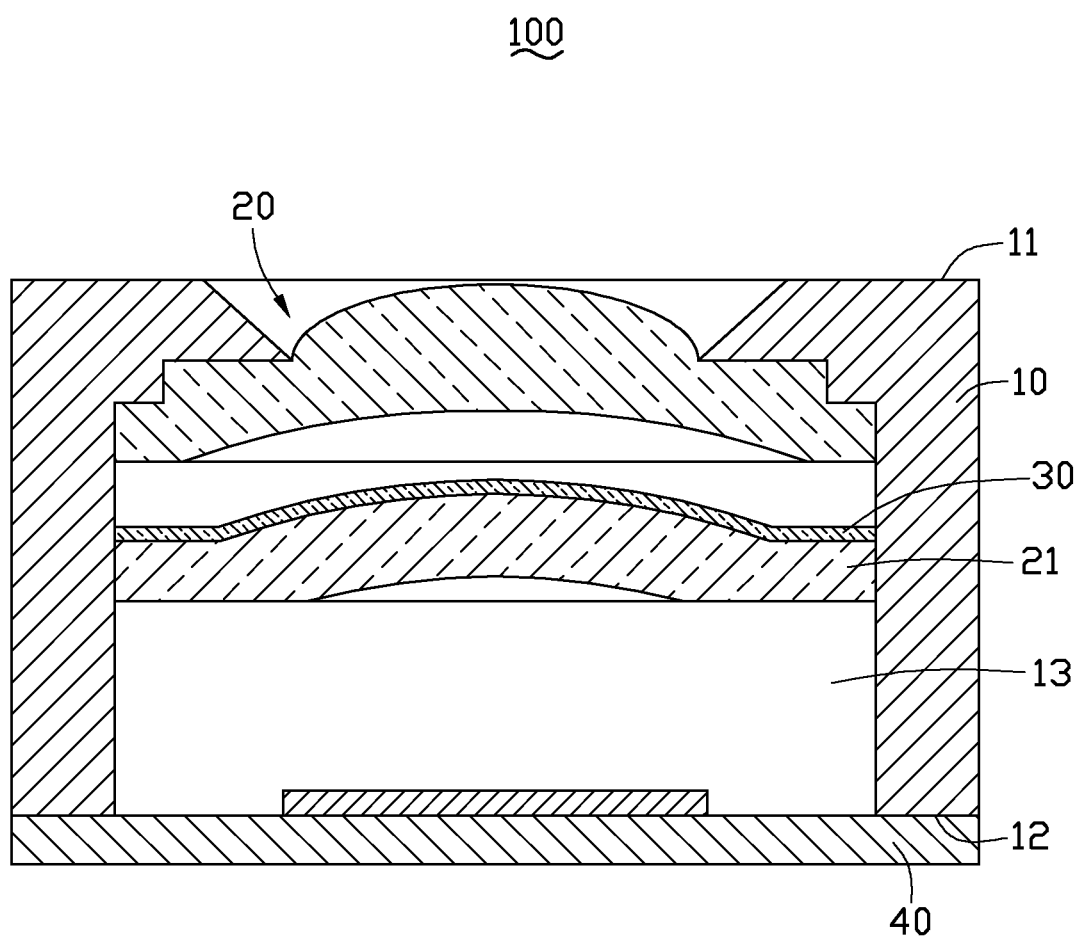
FIG. 1 is a cross-sectional schematic view of a lens module in accordance with a first exemplary embodiment.

FIG. 1 shows a lens module 100, according to a first exemplary embodiment. The lens module 100 includes a lens barrel 10, a plurality of optical elements 20, an infrared absorbing filter 30, and an image sensor 40.

The lens barrel 10 is tubular and includes an object-side end 11 and an image-side end 12 opposite to the object-side end 11. The lens barrel 10 defines a substantially tubular receiving room 13 extending through the object-side end 11 and the image-side end 12. In this embodiment, the lens barrel 10 is made of light-shielding/opaque/black material(s).

The optical element 20 comprises one or more lenses 21 received in the receiving room 13, adjacent to the object-side end 11. The lens 21 may be made of plastic, glass, or other transparent materials, and may be spherical or aspherical. The lens 21 is configured for converging or diverging light penetrating therethrough. In this embodiment, the lens module 100 includes two lenses 21 arranged in the receiving room 13.

The infrared absorbing filter 30 covers any one optical surface of the lens 21. It is should to be understood, the infrared absorbing filter 30 can cover an image-side surface of the lens 21, and also can cover an object-side surface of the lens 21. The infrared absorbing filter 30 is configured for absorbing infrared light projecting on the infrared absorbing filter 30. The infrared absorbing filter 30 includes an electrochromic substrate 31, an anti-reflection film 32, and an infrared filtering film 33.

Figure 2:
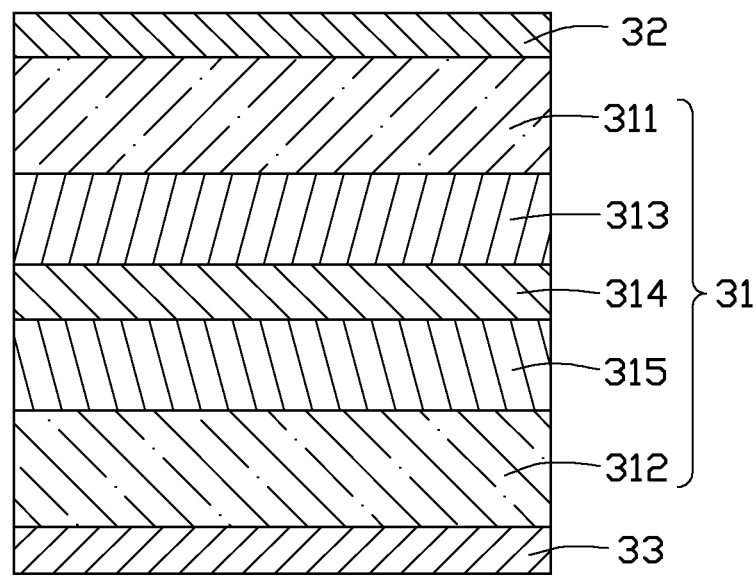
FIG. 2 is a cross-sectional schematic view of an infrared absorbing filter of the lens module of FIG. 1.

In FIG. 2, the electrochromic substrate 31 includes a first transparent conductive layer 311, a second transparent conductive layer 312, a metal ion film 313, an electrolytic film 314, and a metal oxide film 315. The metal ion film 313, the electrolytic film 314, and the metal oxide film 315 are positioned in that order between the first transparent conductive layer 311 and the second transparent conductive layer 312.

The first transparent conductive layer 311 is closest to the anti-reflection film 32, and the second transparent conductive layer 312 is closest to the infrared filtering film 33. A positive terminal and a negative terminal of a power source (not shown) are respectively connected to the first transparent conductive layer 311 and the second transparent conductive layer 312. The metal ion film 313 is a lithium (Li) film, and configured for providing Li+ The metal oxide film 315 is a $WO_3$ film. When the $Li^+$ strikes the $WO_3$ film, the color of the electrochromic substrate 31 changes to blue. In other embodiments, the metal ion can also be $Na^+$ or $Ag^+$, and the metal oxide can also be $TiO_2$ or $Nb_2O_5$.

In this embodiment, the first transparent conductive layer 311 and the second transparent conductive layer 312 are conductive glasses or conductive films. If the conductive layers are conductive glasses, the first transparent conductive layer 311 and the second transparent conductive layer 312 can be hot bent according to the shape of the lens 21. Then the infrared absorbing filter 30 can be wholly in contact with the lens 21. If the conductive layers are conductive films, the first transparent conductive layer 311 and the second transparent conductive layer 312 can be installed on the lens 21 with an evaporation coating process.

The anti-reflection film 32 is coated on the first transparent conductive layer 311. The infrared filtering film 33 is coated on the second transparent conductive layer 312. The anti-reflection film 32 includes first to fourth layers stacked in a particular order on the first transparent conductive layer 311. The odd numbered layers (1 and 3) of the anti-reflection film 32 are made from titanium dioxide ($TiO_2$) and the even numbered layers (2 and 4) of the anti-reflection film 32 are made from silicon dioxide ($SiO_2$). The infrared filtering film 33 includes first to fifty fourth layers stacked in a particular order on the second transparent conductive layer 312. The odd numbered layers of the infrared filtering film 33 are made from $TiO_2$, and the even numbered layers of the infrared filtering film 33 are made from $SiO_2$. The thickness of each layer is designed according to the optical characteristics required for the anti-reflection film 32 and the infrared filtering film 33.

The anti-reflection film 32 can have any number of layers with other materials for the non-reflection of light. The infrared filtering film 33 can have any number of layers with other materials for filtering out infrared light.

The image sensor 40 is positioned at the image-side end 12 and covers the receiving room 13. The light penetrating the at least one lens 20 and the infrared absorbing filter 30 are projected on an imaging surface of the image sensor 40 which converts the light to electrical signals.

Before each use of the lens module 100, a preset voltage, such as 1.2V, is applied on the electrochromic substrate 31. An electric field is formed between the first transparent conductive layer 311 and the second transparent conductive layer 312, the $Li^+$ of the metal ion film 313 is transmitted to the $WO_3$ film of the metal oxide film 315 through the electrolytic film 314 under the influence of the electric field. When the $Li^+$ emitted from the metal ion film 313 strikes the $WO_3$ film of the metal oxide film 315, the color of the metal oxide film 315 changes to blue, such that the color of the whole electrochromic substrate 31 changes to blue. When the voltage applied on the electrochromic substrate 31 is removed, the electrochromic substrate 31 retains the blue color for about 600 second(s).

Light enters into the lens module 100 from the object-side end 11 of the lens barrel 10 and strikes the infrared absorbing filter 30. The light penetrates the anti-reflection film 32, then the electrochromic substrate 31, and then the infrared filtering film 33. The infrared constituent of the light penetrating the anti-reflection film 32 are absorbed by the electrochromic substrate 31 in its blue color state, and only the light with wavelengths from about 420 nm to about 680 nm penetrate through the electrochromic substrate 31.

The value of the voltage applied on the electrochromic substrate 31 is gradually increased from 0 to the preset voltage, and the color of the electrochromic substrate 31 gradually changes from colorlessness to blue. If the value of the preset voltage is increased, the blue color of the electrochromic substrate 31 becomes darker and the infrared-filtering abilities of the infrared absorbing filter 30 will be changed. During each use of the lens module 100, the voltage applied on the electrochromic substrate 31 can be reset according to the absorbency or filtering which is required.

The anti-reflection film 32 provides an enhanced transmissivity for light, and thus less than about 3% will now be reflected by the anti-reflection film. As the infrared filtering film 33 can further filter the infrared constituent of light, less infrared light will be projected on the image sensor 40. Therefore any glare in an image will be reduced, and the quality of the image enhanced.

Figure 3:
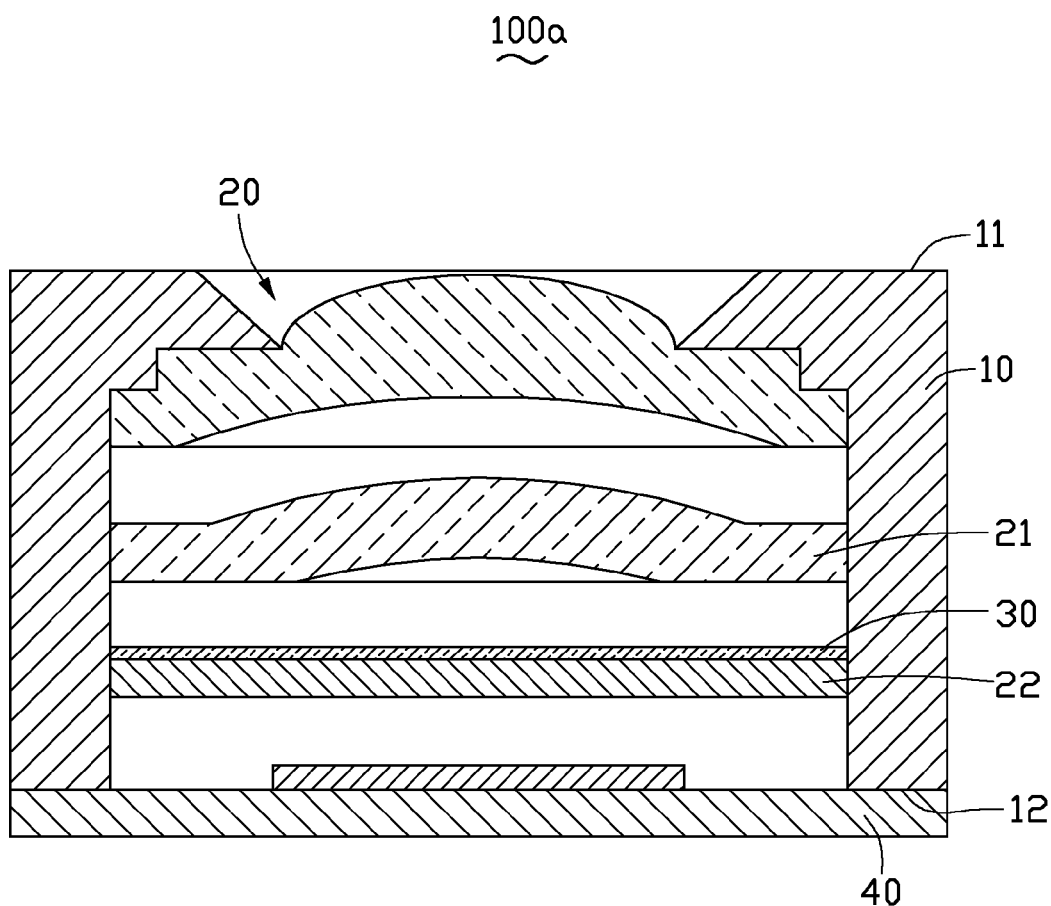
FIG. 3 is a cross-sectional schematic view of a lens module in accordance with a second exemplary embodiment.

In FIG. 3, shows a lens module 100a, according to a second exemplary embodiment. The difference between the lens module 100 of the first exemplary embodiment and the lens module 100a of the second exemplary embodiment is that the optical element 20 of the lens module 100a further comprises a filter glass 22. The filter glass 22 is a flat disc, and has two flat surfaces. The filter glass 22 is received in the receiving room 13, and positioned between the at last one lens 21 and the image sensor 40. The infrared absorbing filter 30 covers any one optical surface of the filter glass 22. In the illustrated embodiment, the infrared absorbing filter 30 covers one flat surface of the filter glass 22 and faces the at least one lens 21.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising:
   an optical element;
   an infrared absorbing filter covered on the optical element, and comprising:
   an electrochromic substrate;
   wherein a color of the electrochromic substrate is changed to blue when a preset voltage is applied on the electrochromic substrate, the electrochromic substrate is configured for absorbing infrared constituent of light projected on the lens module when the color is changed to blue; when the preset voltage applied on the electrochromic substrate is removed, the electrochromic substrate retains the blue color for about 600 seconds;
   wherein the electrochromic substrate comprises a first transparent conductive layer, a second transparent conductive layer, a metal ion film, an electrolytic film, and a metal oxide film; the metal ion film, the electrolytic film, and the metal oxide film are orderly positioned between the first transparent conductive layer and the second transparent conductive layer; the infrared absorbing filter comprises an anti-reflection film and an infrared filtering film, and the electrochromic substrate is positioned between the anti-reflection film and the infrared filtering film.

2. The lens module of claim 1, wherein the anti-reflection film is coated on the first transparent conductive layer.

3. The lens module of claim 1, wherein the infrared filtering film is coated on the second transparent conductive layer.

* * * * *